United States Patent [19]

Jessee

[11] 3,972,188

[45] Aug. 3, 1976

[54] CONTROL SYSTEM WITH ACTUATOR POWERED BY DUAL SOURCES

[75] Inventor: James M. Jessee, Fountain Valley, Calif.

[73] Assignee: Bertea Corporation, Irvine, Calif.

[22] Filed: Oct. 9, 1975

[21] Appl. No.: 621,090

[52] U.S. Cl. .................................. 60/443; 60/444; 60/486
[51] Int. Cl.² ..................... F15B 15/18; F16H 39/46
[58] Field of Search ............ 60/433, 434, 443, 444, 60/479, 486, 489, 493

[56] References Cited
UNITED STATES PATENTS

| | | | |
|---|---|---|---|
| 2,370,526 | 2/1945 | Doran | 60/493 X |
| 3,166,891 | 1/1965 | Weisenbach | 60/433 X |
| 3,186,310 | 6/1965 | Neff et al. | 60/443 X |

*Primary Examiner*—Edgar W. Geoghegan
*Attorney, Agent, or Firm*—Gordon L. Peterson

[57] ABSTRACT

A control system comprising an actuator having a fluid responsive member movable in at least first and second directions and two sources for controlling the fluid responsive member. A first of these sources includes a servo pump which pumps fluid from one side of the fluid responsive member to the other to thereby control the position of the fluid responsive member. A second of these sources includes a valve which controls the supply of fluid under pressure to the fluid responsive member and the return of fluid from the fluid responsive member. The servo pump and valve are arranged in parallel with their flows being summed at the actuator.

16 Claims, 4 Drawing Figures

U.S. Patent   Aug. 3, 1976   3,972,188
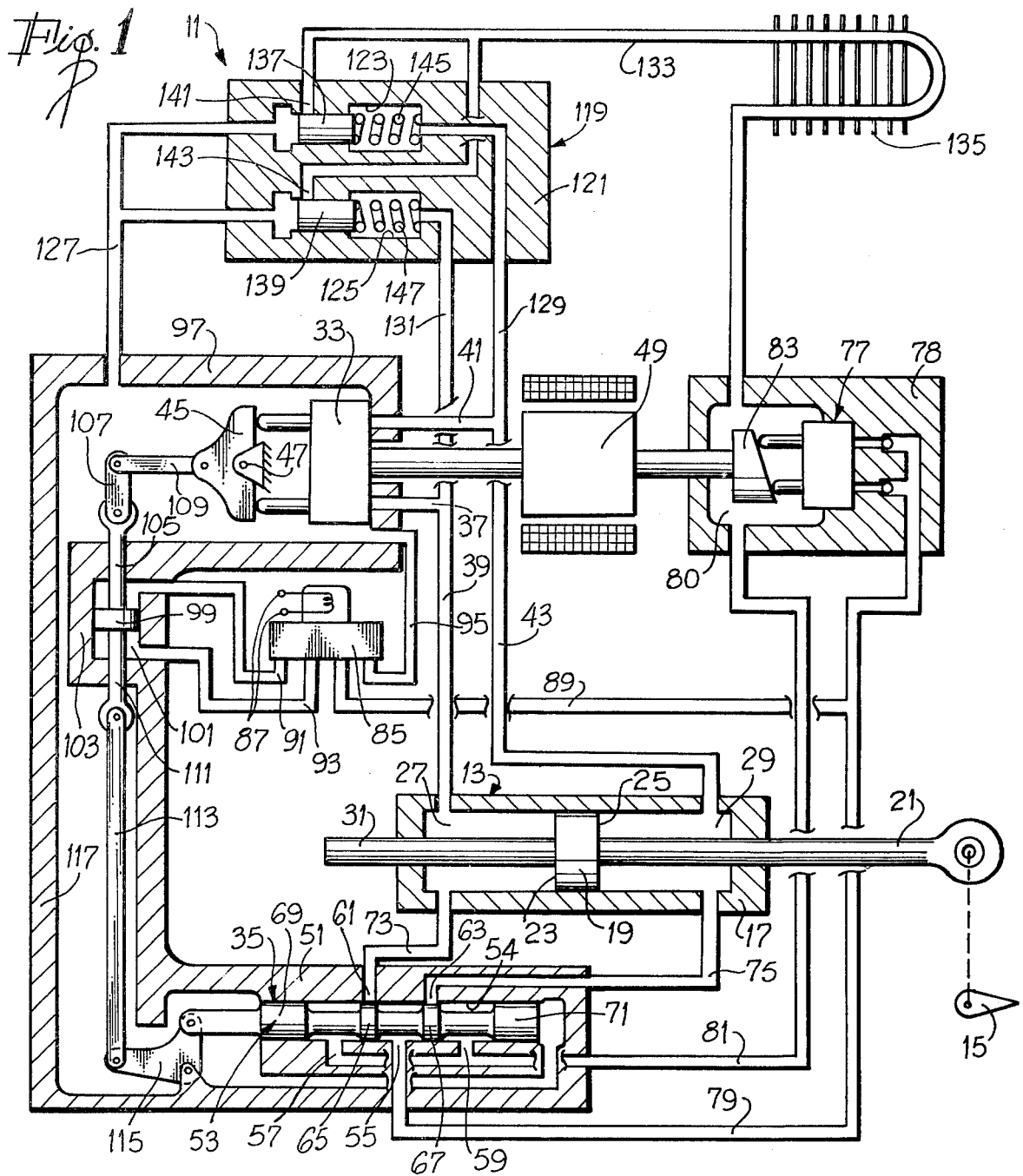
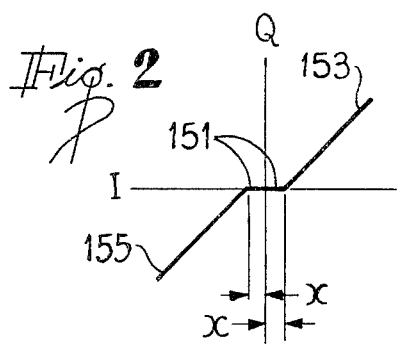
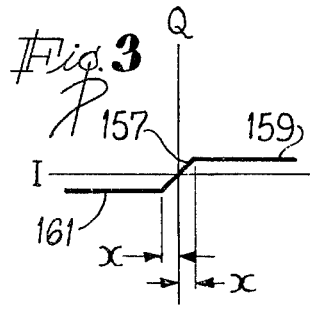
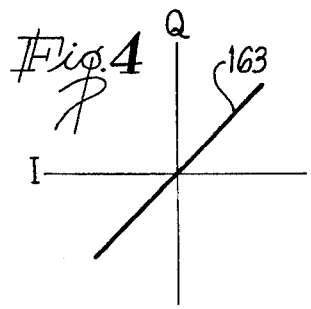

CONTROL SYSTEM WITH ACTUATOR POWERED BY DUAL SOURCES

BACKGROUND OF THE INVENTION

The invention herein described was made in the course of or under a contract or subcontract thereunder with the United States Air Force.

Control systems are known in which a hydraulic servo actuator is powered with a servo pump. In a typical system of this type, the actuator may include a pressure responsive member in the form of a piston and the servo pump may be of the swash-plate type. The servo pump controls the position of the piston by pumping fluid from one side of the piston to the other.

Control systems of this type exhibit many desirable characteristics. Unfortunately, however, the servo pump has low gain at and near null. This results in poor stiffness of the system at and near null. In other words, a given change in the input signal to the control system at or near null will not produce as large, or as predictable, a change in flow rate to the actuator as a corresponding signal change well away from null.

Null is a steady state condition of the actuator in which there is substantially no flow to or from the actuator. The input signal is representative of the desired change in position of the piston. For example, the input signal may be the sum of a command signal which represents a position in which the piston should be and a feedback signal which represents the actual instantaneous position of the piston.

SUMMARY OF THE INVENTION

The present invention provides a control system which has good stiffness throughout its full range of operation. This is accomplished by using multiple sources to power the actuator. A first of these sources provides good stiffness for a first range of values of the input signal and a relatively poor stiffness for a second range of values of the input signal. A second of the sources provides good stiffness for the second range of values of the input signal and relatively poorer stiffness for the first range of values of the input signal. These sources are arranged in parallel with their outputs being summed to provide the control system with good stiffness characteristics throughout its full range of operation.

The first of these power sources may include a servo pump which operates by pumping fluid from one side of the pressure responsive member to the other. Although the servo pump provides the system with relatively poor stiffness characteristics at and near null, it provides good stiffness characteristics outside of this range.

The second of these sources may include a source of fluid under pressure and a valve for controlling the supply of fluid under pressure to the fluid responsive member and the return of fluid from the fluid responsive member. The valve provides a stiffness characteristic which is substantially superior (a matter of magnitude not direction) to the stiffness characteristic provided by the servo pump. Thus, the valve provides good stiffness at and near null and is limited, but by choice (for power limits) stiffness outside of this range. Accordingly, by arranging the valve and the servo pump in parallel and summing their outputs, the control system will exhibit good stiffness characteristics throughout its full range of operation.

Within reasonable limits, the relationships between the input signal and flow rate to the valve can be varied. However, at and near null, the valve should provide a flow rate to the actuator which varies in accordance with changes in the input signal and preferably this relationship is linear. Outside of this range, the valve preferably supplies fluid under pressure to the actuator at a substantially fixed rate which is the maximum flow rate through the valve.

The valve is sized and configured so that when the input signal reaches a predetermined value, the valve supplies fluid to the actuator at a substantially fixed rate. However, for input signal values above the predetermined value, the servo pump is capable of providing the necessary stiffness and response. Thus, the valve has basic control of the actuator for input signal values less than the predetermined value and for input signal values above predetermined value, the servo pump assumes basic control of the actuator.

It is known to use a four-way valve for controlling an actuator throughout the full range of operation. However, the valve has a high power loss, and therefore rejects heat to the fluid at higher flow rates. The present invention eliminates these disadvantages by limiting the flow rate through the valve to the flow rates required at the near null. By way of example, the flow rates through the valve can be limited to the flow rate commanded by an input signal which is 7–10 percent of the input signal at full load. This prevents high power loss through the valve and consequent heat rejection while fully compensating for the width of the deadband exhibited by the servo pump.

Fluid under pressure can be supplied to the valve by an auxiliary pump. The auxiliary pump is preferably a variable delivery, constant pressure pump such as a swash-plate pump. The auxiliary pump should be capable of providing, as a function of pressure, variable delivery rates on demand.

It is known to use an auxiliary pump such as a gear pump to provide makeup for leakage from the control system. However, the auxiliary pump of this invention is utilized to supply fluid under pressure to a four-way valve which in turn is used as one of multiple parallel sources for powering the actuator.

The actuator which is controlled by the dual parallel sources may be any fluid driven power source such as a balanced actuator, an unbalanced linear actuator, a rotary actuator, or a hydraulic motor. The term "actuator" as used herein means any and all of these devices.

The input signal controls both the servo pump and the valve. For example, an electro hydraulic valve may be responsive to the input signal to provide a fluid control signal which in turn controls the position of a control piston. The control piston can be mechanically linked to the swash plate of the servo pump and to the valve to simultaneously control both of them.

The servo pump may be located in a case which is filled with fluid pressure. Another feature of the invention is a case pressure regulator which communicates with the opposite sides of the fluid responsive member for controlling the pressure of the fluid in the case. The case pressure regulator may be used to establish various different relationships between case pressure and pressure in the actuator. Preferably, the case pressure regulator may maintain the pressure in the case approximately equal to the pressure on whichever side of the fluid responsive member has the lower pressure. This reduces leakage at the servo pump and therefore reduces makeup to the valve at null. The case pressure regulator also reduces heat rejection in that with less leakage, less flow to the valve and hence less heat rejection are obtained.

The invention, together with further features and advantages thereof, may best be understood by reference to the following description taken in connection with the accompanying illustrative drawing.

BRIEF DESCRIPTION OF THE DRAWING

FIG. 1 is a schematic view partially in section of a control system constructed in accordance with the teachings of this invention.

FIGS. 2 and 3 are plots of input signal versus flow rate for the servo pump and the valve, respectively.

FIG. 4 is a plot of input signal versus flow rate with the servo pump and valve outputs summed.

DESCRIPTION OF THE PREFERRED EMBODIMENT

FIG. 1 shows a control system 11 which includes an actuator 13 which is usable to position a load such as a flight control surface 15 of an aircraft. Although the actuator 13 can be of various different kinds, in the embodiment illustrated, it includes a housing 17, a fluid responsive member in the form of a piston 19, and a connecting rod 21 suitably coupled to the piston 19 and the flight control surface 15 for positioning the latter. The piston 19 has opposite pressure responsive faces 23 and 25. The piston 19 divides the housing 17 into chambers 27 and 29 on opposite sides of the piston. The actuator 13 is a balanced actuator in that it has a rod 31 attached to the piston 19 opposite the connecting rod 21. In other words, the effective areas of the pressure responsive faces 23 and 25 are equal.

The piston 19 can be moved by a servo pump 33 and/or a four-way valve 35. The servo pump 33 communicates with the chamber 27 by way of a flow path comprising conduits 37 and 39. Similarly, the servo pump 33 communicates with the chamber 29 by way of a flow path comprising conduits 41 and 43. The servo pump 33 may be of any type which is capable of controlling the position of the piston 19 in the housing 17 by pumping fluid between the chambers 27 and 29. In the embodiment illustrated, the servo pump 33 is in the form of a swash-plate pump, and it includes a swash plate 45 suitably mounted for pivotal movement about a pivot axis 47.

With the swash plate 45 at a neutral or null position, the pump delivery is zero. With the swash plate 45 tilted to one side of null, the pump 33 draws fluid from the conduit 37 and discharges it into the conduit 41, and with the swash plate 45 tilted on the other side of neutral, the pump draws fluid from the conduit 41 and delivers it into the conduit 37. The flow rate of the fluid discharged by the pump 33 is controlled by the angle of the swash plate 45. Servo pumps of this type are conventional. The pump 33 can be driven by a motor such as an electric motor 49.

The valve 35 in the embodiment illustrated is a spool valve and includes a valve housing 51 and a spool 53 slidable in a passage 54 in the housing. The valve housing 51 has a supply port 55, a pair of return ports 57 and 59, and actuator ports 61 an 63, each of which communicates with the passage 54.

The spool 53 has control lands 65 and 67 and end lands 69 and 71 which block off the opposite ends of the passage 54 in the valve housing 51. In the position shown in FIG. 1, the spool 53 is at null in which the lands 65 and 67 close or substantially close the actuator ports 61 and 63.

The port 61 communicates with the chamber 27 through a conduit 73 and the port 63 communicates with the chamber 29 through a conduit 75. The valve 35 is supplied with fluid under pressure from a suitable source of fluid under pressure such as an auxiliary pump 77 having a housing 78 via a supply conduit 79. Fluid is conducted to a reservoir 80 in the housing 78 by the ports 57 and a low pressure return conduit 81.

Fluid under pressure can be supplied to the valve 35 through the conduit 79 by any device which is capable of providing variable quantities of fluid at substantially constant pressure. Thus, although other devices could be used, in the embodiment illustrated this function is carried out by the auxiliary pump 77 which is a fixed displacement constant pressure pump of the swash plate type. The pump 77 includes a swash plate 83 which is driven by the motor 49. Although variable delivery can be provided in different ways, in the embodiment illustrated, it is accomplished by throttling the inlet of the pump 77. Pumps of this type are conventional.

Both the servo pump 33 and the valve 35 are controlled by an electro hydraulic valve 85. The electro hydraulic valve 85 receives an electrical input signal at terminals 87 and in response thereto provides a fluid output signal in a well-known manner. Specifically, the valve 85 receives fluid from the conduit 79 via a conduit 89. The valve 85 divides the flow from the conduit 89 in accordance with the input signal between conduits 91 and 93 with the excess fluid flowing through a conduit 95 to a case 97 for the servo pump 33. Electro hydraulic valves of this type are conventional.

The conduits 91 and 93 lead to the opposite sides of a control piston 99 which is mounted for movement in a passage 101 of a housing 103. Thus, the electro hydraulic valve 85 responds to the input signal 87 by controlling the position of the piston 99 in the passage 101.

The movement of the piston 99 can be used in a variety of ways to control the output of the servo pump 33 and the output of the valve 35. In the embodiment illustrated, mechanical linkages are utilized to permit the control piston 99 to change the angle of the swash plate 45 and to move the spool 53 axially relative to the housing 51. Specifically, the mechanical linkages includes a connecting rod 105 coupled to the piston 99 and a pair of links 107 and 109 pivotally joined to each other and to the connecting rod and the swash plate 45, respectively. The mechanical linkage for controlling the spool 53 includes a connecting rod 111 joined to the piston 99 and a link 113 pivotally connected to the outer end of the connecting rod. A bell crank 115 is pivotally mounted to any fixed structure such as the valve housing 51. Opposite ends of the bell crank 115 are pivotally connected to the link 113 and one end of the spool 53, respectively.

The case 97 and the valve housing 51 are maintained in fluid communication by a linkage housing 117 which contains the link 113. The present invention includes a case pressure regulator 119 for controlling the pressure in the case 97 and the housings 51 and 117.

The case pressure regulator 119 includes a housing 121 having parallel passages 123 and 125 extending therethrough. One end of each of the passages 123 and 125 is in communication with the interior of the case 97 via a conduit 127. The other ends of the passages 123 and 125 communicate with the conduits 43 and 39, respectively, via conduits 129 and 131. Intermediate regions of the passages 123 and 125 are in communication with a return conduit 133 which passages through a cooler 135 and extends to the reservoir 80.

Pistons 137 and 139 are mounted for sliding movement in the passages 123 and 139, respectively. In the positions shown in FIG. 1, the pistons 137 and 139 block ports 141 and 143, respectively, leading to the conduit 133. Identical springs 145 and 147 urge the pistons 137 and 139, respectively, to the left as viewed in FIG. 1.

The piston 137 will assume a position in the passage 123 which is dependent upon the relative pressures in the conduits 127 and 129 and the strength of the spring 145. Similarly, the piston 139 will assume a position in the passage 125 which is dependent upon the relative pressures in the conduits 127 and 131 and the strength of the spring 147. In this manner, the maximum pressure in the case 97 and hence in the housings 51 and 117 can be limited to some function of the pressure in the chamber 27 or the chamber 29, whichever is lesser.

If the opposite pressure responsive faces of the pistons 137 and 139 are of approximately equal area and if the springs 145 and 147 are very light, then the maximum pressure in the case 97 cannot exceed the pressure in the chamber 27 or the pressure in the chamber 29, whichever is lower. For example, if the pressure in the chamber 27 is less than in the chamber 29, then this pressure acts on the right face of the piston 139. If the pressure in the case 97 increases slightly above this level, it will be able to force the piston 139 to the right against the biasing action of the light spring 147 to open the port 143 whereby a flow path from the case 97 to the low pressure return conduit 133 is established. If the pressure in the chamber 29 is lower than in the chamber 27, then the pressure in the conduit 127 moves the piston 137 to open the port 141 to establish communication between the case 97 and the return conduit 133.

In operation of the control system 11, the motor 49 drives the servo pump 33 and the auxiliary pump 77. In response to an input signal at the terminals 87, the electro hydraulic valve 85 divides the flow from the conduit 89 between the conduits 91 and 93 to position the control piston 99. This sets the angle of the swash plate 45 and the position of the spool 53 in accordance with the input signal.

Assuming that the input signal calls for movement of the piston 19 of the actuator 13 to the right as viewed in FIG. 1, the servo pump 33 pumps fluid from the chamber 29 through the conduits 43, 41, 37, and 39 to the chamber 27. In addition, the spool 53 is moved to the left from the position shown in FIG. 1 so that the lands 65 and 67 uncover the ports 61 and 63, respectively. The auxiliary pump 77 pumps fluid from the reservoir 80 through the supply conduit 79, the supply port 55, the actuator port 61, and the conduit 73 to the chamber 27. In addition, fluid can flow through the actuator conduit 75, the actuator port 63, the return port 59, and the return conduit 81 to return, i.e. to the reservoir 80 of the auxiliary pump.

To move the piston 19 to the left, the action described above for the servo pump 33 and the valve 35 is reversed. To maintain the piston 19 in position, both the swash plate 45 and the spool 53 are maintained at null, and there is substantially no flow to and from the actuator 13.

With the arrangement shown in FIG. 1, the servo pump 33 and the valve 35 are in parallel and the flows from these devices sum at the actuator 13. Of course, the flows can be summed at any location so long as the actuator 13 receives the sum of the flows.

Case pressure acts at the axial outer ends of the end lands 69 and 71 and exists in the housing 51 and 117 and in the case 97. The case pressure regulator 119 operates as described above to maintain the pressure within the case 97 and the housings 51 and 117 no greater than about the pressure in the chambers 27 and 29, whichever is lower. Of course, by changing the relative areas of the pressure responsive faces of the pistons 137 and 139 and/or the strength of the springs 145 and 147, the maximum pressure limit in the case 97 and the housings 51 and 117 can be set at a new value.

The concepts of the present invention can be further understood with reference to FIGS. 2–4. FIG. 2 is a plot of input signal I versus flow rate Q from the servo pump 33 with only the servo pump operating and with the valve 35 eliminated from the system. The input signal represents the difference between a command signal which represents the desired position of the piston 19 and a feedback signal indicating the actual position of the piston 19.

FIG. 2 shows that for a range of input signals having a value of $\pm x$ there is substantially no flow produced by the servo pump 33. In other words for the input signal range of $\pm x$, the servo pump exhibits a deadband characteristic which produces poor response and a loss of stiffness. Characteristically, the signal range $\pm x$ is in the order of $\pm 7$–10 percent of the input signal at full load. In the input signal range of $\pm x$, the flow is substantially zero, and a curve segment 151 represents substantially zero flow. For signal values greater than $\pm x$, the delivery rate of the servo pump 33 varies substantially linearly with the magnitude of the input signal, and this is illustrated by curve segments 153 and 155.

FIG. 3 is a plot similar to FIG. 2 but with only the valve 35 operating and with the servo pump 33 out of the system. The flow rate characteristic for the valve 35 is substantially opposite that of the servo pump 33 in that for a signal range of $\pm x$ the relationship between input signal and flow rate is substantially linear as shown by curve segment 157. Conversely, for input signals outside the range of $\pm x$, the valve 35 supplies fluid at a substantially fixed rate as indicated by curve segments 159 and 161. In other words, the valve 35 is wide open for signal values of $\pm x$, and therefore cannot provide an increase in flow rate in response to increases in the magnitude of the input signal.

FIG. 4 shows a curve 163 which represents the flow to the actuator 13 when both the servo pump 33 and the valve 35 are used. In other words, the curve 163 represents a summation of the flows depicted graphically in FIGS. 2 and 3. The curve 163 is substantially linear throughout the full range of operation of the control system 11. In order to accomplish this, the slopes of the curve segments 153, 155, and 157 must be substantially parallel and the $\pm x$ signal values for the servo pump (FIG. 2) and for the valve 35 (FIG. 3) must be approximately the same. In other words, when the input signal reaches a value of slightly greater than $\pm x$, the servo pump 33 begins delivering fluid in accordance with the curve segment 153 and the valve 35 delivers fluid in accordance with the curve segment 159.

Although an exemplary embodiment of the invention has been shown and described, many changes, modifications and substitutions may be made by one having ordinary skill in the art without necessarily departing from the spirit and scope of this invention.

I claim:

1. A control system comprising:
   an actuator including a fluid responsive member movable in at least first and second directions;
   servo pump means for supplying fluid under pressure to the fluid responsive member and receiving fluid under pressure from the fluid responsive member to move the fluid responsive member in either of said directions;
   means for providing a source of fluid under pressure;
   valve means for controlling the supply of fluid under pressure from said source to the fluid responsive member and the return of fluid from the fluid responsive member provide at least some control over the movement of the fluid responsive member whereby the servo pump means and the valve means cooperate to control the fluid responsive member; and
   said servo pump means and said valve means being arranged so that the actuator receives the sum of the flows from the servo pump means and the valve means.

2. A control system as defined in claim 1 including means for providing a fluid control signal and first means responsive to the fluid control signal for controlling said servo pump means and said valve means.

3. A control system as defined in claim 2 wherein said first means includes a piston movable by said fluid control signal and mechanical means for coupling said piston to said servo pump means and said valve means.

4. A control system as defined in claim 1 wherein said source providing means includes a variable delivery pump for providing the fluid under relatively constant pressure to said valve means.

5. A control system as defined in claim 1 including a case and wherein the servo pump means is at least partially in said case, said case being adapted to receive fluid under pressure, said control system including case pressure regulator means communicating with the opposite sides of said fluid responsive member for controlling the pressure of the fluid in said case.

6. A control system as defined in claim 5 wherein said case pressure regulator means maintains the pressure in said case approximately equal to the pressure on whichever side of the fluid responsive member has the lower pressure.

7. A control system comprising:
   an actuator including a fluid responsive member movable in at least first and second directions;
   a servo pump;
   means defining first and second flow paths between the actuator and the servo pump, said servo pump being capable of pumping fluid from the servo pump through the first flow path to the actuator and from the actuator through the second flow path to thereby move the fluid responsive member in the first direction and capable of pumping fluid from the servo pump through the second flow path to the actuator and from the actuator through the first flow path to move the fluid responsive member in the second direction;
   an auxiliary pump capable of providing fluid under pressure at variable delivery rates;
   a valve;
   means defining a supply flow path leading from the auxiliary pump to the valve and a return flow path leading from the valve;
   means defining third and fourth flow paths between the valve and the actuator;
   said valve including means for controlling the flow of fluid from the supply flow path to the third and fourth flow paths and from the third and fourth flow paths to the return flow path to at least assist in moving the fluid responsive member in either of said directions; and
   means for controlling said servo pump and said valve.

8. A control system as defined in claim 7 wherein said fluid responsive member is primarily controlled by said auxiliary pump and said valve in a first range of flow rates which includes the flow rates immediately adjacent null of the pressure responsive member, and said fluid responsive member being primarily controlled by said servo pump at flow rates outside of said first range.

9. A control system responsive to an input signal having a first range of values and a second range of values, said control system comprising:
   a fluid driven power source responsive to fluid under pressure to drive a load;
   first means responsive to the value of said input signal being in said first range for supplying fluid under pressure to the power source in accordance with a first program in which the flow rate of the fluid under pressure supplied to the power source varies with the value of said input signal;
   said first means being responsive to the value of said input signal being substantially in a second range for supplying fluid under pressure to the power source in accordance with a second program;
   the variation in flow rate of fluid under pressure from said first means per increment of change in the value of said input signal being greater in said first program than in said second program;
   second means repsonsive to the value of said signal being in said second range for supplying fluid under pressure to the power source in accordance with a third program in which the flow rate of fluid under pressure supplied to the power source varies with the value of said input signal;
   said second means being responsive to the value of said input signal being in the first range for supplying fluid under pressure to the power source in accordance with a fourth program;
   the variation in the flow rate of fluid under pressure from the second means per increment of change in the value of said input signal being greater in said third program than in said fourth program; and
   said first means and said second means being arranged so that the fluid driven power source receives the sum of the flows from the servo pump means and the valve means.

10. A control system as defined in claim 9 wherein said power source includes a fluid responsive member movable in either of first and second directions, said first means includes servo pump means for supplying fluid under pressure to the fluid responsive member and receiving fluid under pressure from the fluid responsive member to move the fluid responsive member in either of said directions and said second means includes means for providing a source of fluid under pressure and valve means for controlling the supply of fluid under pressure from said source to the fluid responsive member and the return of fluid from the fluid responsive member to provide at least some control over the movement of the fluid responsive member whereby the servo pump means and the valve means cooperate to control the fluid responsive member.

11. A control system as defined in claim 9 wherein said sum of the flows varies substantially linearly with the input signal.

12. A control system as defined in claim 9 wherein the second range of values is higher than the first range of values, the maximum value of said first range of values being no more than about 10 percent of the maximum value of the second range of values.

13. A control system as defined in claim 9 wherein in said second program said first means supplies fluid to the power source at a first substantially fixed rate.

14. A control system as defined in claim 13 wherein in said fourth program said second means supplies fluid to the power source at a second substantially fixed rate.

15. A control system as defined in claim 14 wherein said first fixed rate is greater than zero and said second fixed rate is substantially zero.

16. A control system as defined in claim 13 wherein said first substantially fixed rate is the maximum flow rate for said first means.

* * * * *